(12) United States Patent  
Yellambalase

(10) Patent No.: US 9,305,463 B1
(45) Date of Patent: Apr. 5, 2016

(54) AUTOMATICALLY ACTIVATED IN-CABIN VEHICLE CAMERA SYSTEM

(71) Applicant: Atieva, Inc., Redwood City, CA (US)

(72) Inventor: Yadunandana Yellambalase, Foster City, CA (US)

(73) Assignee: Atieva, Inc., Menlo Park, CA (US)

( * ) Notice: Subject to any disclaimer, the term of this patent is extended or adjusted under 35 U.S.C. 154(b) by 0 days.

(21) Appl. No.: 14/588,562

(22) Filed: Jan. 2, 2015

Related U.S. Application Data

(63) Continuation-in-part of application No. 14/588,463, filed on Jan. 2, 2015.

(51) Int. Cl.
*G08G 1/16* (2006.01)
*G06K 9/00* (2006.01)
*H04N 21/422* (2011.01)

(52) U.S. Cl.
CPC ............ *G08G 1/167* (2013.01); *G06K 9/00798* (2013.01); *H04N 21/42203* (2013.01)

(58) Field of Classification Search
CPC ........................... G08G 1/167; G08G 9/00798
See application file for complete search history.

(56) References Cited

U.S. PATENT DOCUMENTS

| 5,983,183 | A | * | 11/1999 | Tabet | H03G 3/3089 381/108 |
| 6,593,960 | B1 | * | 7/2003 | Sugimoto | B60R 11/04 348/142 |
| 2004/0193371 | A1 | * | 9/2004 | Koshiji | G01C 21/3688 701/455 |
| 2005/0232469 | A1 | * | 10/2005 | Schofield | G06K 9/00818 382/104 |
| 2006/0215020 | A1 | * | 9/2006 | Mori | B60R 1/00 348/119 |
| 2012/0218412 | A1 | * | 8/2012 | Dellantoni | G01C 21/3602 348/148 |
| 2015/0203033 | A1 | * | 7/2015 | Watanabe | B60R 1/00 348/148 |
| 2015/0232065 | A1 | * | 8/2015 | Ricci | B60R 25/01 701/36 |
| 2015/0274074 | A1 | * | 10/2015 | Petrillo | B60R 1/00 701/36 |

* cited by examiner

*Primary Examiner* — Van Trieu
(74) *Attorney, Agent, or Firm* — Patent Law Office of David G. Beck

(57) ABSTRACT

A method is provided for automatically activating an in-cabin camera system whenever the control system determines that the volume level of sounds detected within the car are in excess of a preset sound level, thereby allowing the driver under certain circumstances to monitor occupants of the rear portion of the passenger cabin without stopping the car or turning around in their seat. The system can be configured to analyze the detected sounds and compare those sounds to preset sound patterns, thus helping the system to distinguish between routine background noise and any sounds that indicate that activation of the in-cabin camera system is warranted.

17 Claims, 12 Drawing Sheets

AUTOMATICALLY ACTIVATED IN-CABIN VEHICLE CAMERA SYSTEM

CROSS-REFERENCE TO RELATED APPLICATION

This application is a continuation-in-part of U.S. patent application Ser. No. 14/588,463, filed 2 Jan. 2015, the disclosure of which is incorporated herein by reference for any and all purposes.

FIELD OF THE INVENTION

The present invention relates generally to a vehicle and, more particularly, to a camera-based driver assistance system.

BACKGROUND OF THE INVENTION

Vehicle safety has improved dramatically over the years. Initially many of the improvements were due to advances in the materials selected for various automobile components. For example safety glass, which was first introduced for use in cars in the 1920's, helped to reduce serious injuries and/or fatalities to the driver, passengers and bystanders that often resulted from the windshield or other vehicle windows being shattered in a car crash. Similarly, adding padding to the passenger compartment, most notably to the surfaces of the dashboard, helped minimize head injuries during sudden vehicle stops, especially those due to a collision. Two of the most significant safety advancements made to date, seat belts and air bags, have been estimated to have saved over 300,000 lives in the past 40 years.

While initially most vehicle safety improvements were the result of design changes in individual components or vehicle subsystems, today many of the greatest advances in safety are the result of using a computer to anticipate a problem and provide rapid corrective action. In some instances the computer system is used to enhance vehicle performance, and thus safety, exemplary systems including electronic stability control and anti-lock brakes. In other cases the computer is used to monitor vehicle and/or driver performance and activate warnings when needed. For example, a computer-based system may be used to activate a warning if it appears that the driver is becoming drowsy or driving erratically, e.g., unintentionally departing from the current lane or approaching another car/stationary object at too high a rate of speed or changing lanes when another car is in the driver's blind spot. It yet other systems, in addition to monitoring vehicle/driver performance and activating warnings as deemed necessary, the computer may also be used to augment driver performance to avoid a collision, for example by automatically initiating braking or increasing hydraulic pressure in the braking system during a panic stop. Computer systems are also being used in today's cars to simplify the task of driving, for example by helping the driver to safely park their car using parking sensors and cameras.

Even though technology has been used in recent years to improve vehicle safety, many of these computer-based systems only provide the driver with limited information, for example a warning when the car is about to hit something while being parked. Accordingly, what is needed is a means for effectively and timely communicating data acquired by these systems to the driver, while simultaneously avoiding unnecessary driver distractions. The present invention provides such a system.

SUMMARY OF THE INVENTION

The present invention provides a method of automatically activating an in-cabin camera system mounted within the passenger cabin of a vehicle, the method including the steps of (i) detecting a plurality of sounds generated from within the vehicle's passenger cabin using an in-cabin audio sensor; (ii) monitoring the output of said in-cabin audio sensor with a vehicle system controller; (iii) comparing the volume level corresponding to the plurality of sounds to a preset volume level, where the vehicle system controller automatically performs this step; (iv) automatically displaying a data feed from the in-cabin camera system on an in-cabin display when the volume level of the plurality of sounds exceeds the preset volume level; and (v) terminating the step of automatically displaying the data feed after a preset period of time has elapsed since the volume level of the plurality of sounds exceeded the preset volume level.

In one aspect, the method may further include the steps of analyzing the plurality of sounds in order to determine if at least one of the plurality of sounds matches at least one preset sound pattern, where the vehicle system controller automatically performs the analyzing and determining steps, and where the step of automatically displaying the data feed is only performed if the volume level of the plurality of sounds exceeds the preset volume level and at least one of the plurality of sounds matches at least one preset sound pattern. The at least one preset sound pattern may be stored in a memory coupled to the system controller by the vehicle's manufacturer or by the vehicle's user. In this aspect, the terminating step is performed after the preset period of time has elapsed since the volume level of said plurality of sounds exceeded the preset volume level and at least one of the plurality of sounds matched at least one preset sound pattern.

In another aspect, the method may further include the step of setting the preset volume level, where the preset volume level may be set by the vehicle's manufacturer or by the vehicle's user.

In another aspect, the method may further include the step of setting the preset period of time, where the preset period of time may be set by the vehicle's manufacturer or by the vehicle's user.

In another aspect, the method may further include the step of positioning the in-cabin audio sensor to accentuate detection of sounds from the rear portion of the vehicle's passenger cabin. A directional sensor may be used for the in-cabin audio sensor.

In another aspect, the step of displaying the data feed may be comprised of displaying the data feed on either a primary display or a secondary display, where the method further comprises the step of selecting between the primary display and the secondary display. The step of selecting between the primary and secondary displays may be preset or performed real-time, and may be performed by the vehicle's manufacturer or by a vehicle user.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, integers, steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps or calculations, these steps or calculations should not be limited by these terms, rather these terms are only used to distinguish one step or calculation from another. For example, a first calculation could be termed a second calculation, similarly, a first step could be termed a second step, similarly, a first component could be termed a second component, all without departing from the scope of this disclosure.

Figure 1:
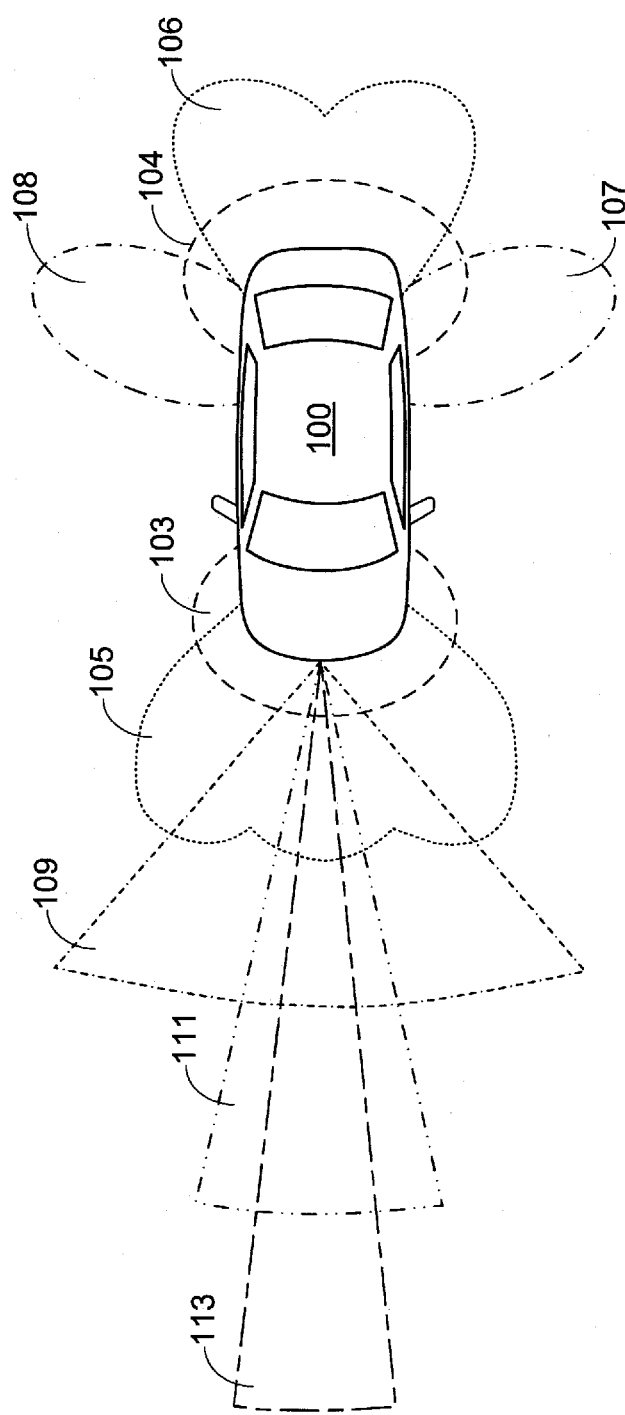
FIG. 1 provides a simplified view of a vehicle, viewed from above the car, along with a plurality of object detection zones associated with a variety of sensor types and locations that may be used with the invention to detect objects that are near the car as well as those that are potentially within the car's pathway.

FIG. 1 provides a simplified view of a vehicle 100, viewed from above the car, along with a plurality of object detection zones that may be used with the invention to detect objects that are near the car as well as those that are potentially within the car's pathway. Although any of a variety of sensor types may be used to define these zones, typically each sensor is selected based on the desired detection range and, in some cases, the desired shape of the detection zone. Sensors that are often used in these applications include radar, electromagnetic, ultrasonic, LIDAR (i.e., light detection and ranging) and cameras.

Zones 103 and 104 extend only a short distance, generally on the order of a foot or two, from the front and rear bumpers, respectively, of vehicle 100. These detection zones are primarily used during parking maneuvers as a means of alerting the driver of various obstacles (e.g., trees, other cars, buildings, etc.). The sensors, either electromagnetic or ultrasonic proximity sensors, that define zones 103 and 104 are commonly integrated into the front and rear bumpers. In a conventional vehicle when one of the sensors defining zones 103/104 detects an object, an audible or a visible warning is activated.

In some vehicles, a secondary zone 105 is provided in front of the vehicle while a secondary zone 106 is provided behind the vehicle. These zones, which extend away from the car for a further distance than that provided by zones 103/104, are used to detect cross traffic or objects that may not be visible to the driver. Zones 105/106 are often of critical importance when moving into traffic from a blind intersection, e.g., an intersection where buildings or other objects prevent the driver from adequately seeing traffic approaching from the left and/or the right. Similarly, these detection zones provide the driver with insight into approaching traffic as the driver attempts to back out of a parking space. In general, when an object is detected in zone 105 when moving forward, or zone 106 when moving backward, an audible or visible warning is activated. Typically short or medium range radar detectors are used to define zones 105 and 106.

Blind spot detection zones 107 and 108, located on the driver's side and the passenger's side, respectively, monitor for cars that are located in the driver's blind spot, i.e., in a location that is difficult to view by the driver due to mirror placement, vehicle pillars, etc. Once an object, i.e., a car, is determined to be in one of the driver's blind spots, a visible warning indicator is illuminated on the same side of the car as the identified object. Thus, for example, a car detected in zone 107 will cause a warning indicator on the driver's side of the car to be illuminated while a car detected in zone 108 will cause a warning indicator on the passenger's side of the car to be illuminated. Typically the warning indicators are located within, or adjacent to, the side mirrors so that they are easily visible when the driver looks in that direction. In other words, if the identified object is in zone 107 the warning indicator on the driver's side of the vehicle is illuminated, while an object identified in zone 108 causes the warning indicator on the passenger's side of the vehicle to be illuminated. As with zones 105/106, typically short or medium range radar detectors are used to detect objects within zones 107/108.

Zone 109 extends in front of car 100 as well as either side, this zone providing lane departure warnings to the driver. Zone 109 uses a camera detection scheme along with image recognition software that is capable of detecting the lane markers that are typically used in multi-lane highways. When the system determines that the car is getting too close to either side of the present lane, a lane departure warning is activated. Generally the lane departure warning may be an indicator on the dash or an audible warning, although in some vehicles a tactile warning may be provided (e.g., a slight vibration in the steering wheel). It will be appreciated that the camera sensor system used with zone 109 may also monitor other roadside conditions, e.g., stop signs, school zone signs, etc.

Some vehicles also include one or more long range zones, e.g., zones 111 and 113, which typically extend hundreds of feet in front of the car. The size and shape of these zones depends at least in part on the selected sensor, e.g., long range radar versus LIDAR. In some vehicles the long range zones may be used to control an adaptive cruise control system, i.e., a cruise control system that can automatically adjust vehicle speed in order to maintain a preset separation distance between a car and a vehicle directly in front of it. These zones may also be used for emergency braking systems that automatically brake the car, or augment the braking system, when the system determines that the car is likely to collide with a pedestrian or other object within its pathway.

Figure 2:
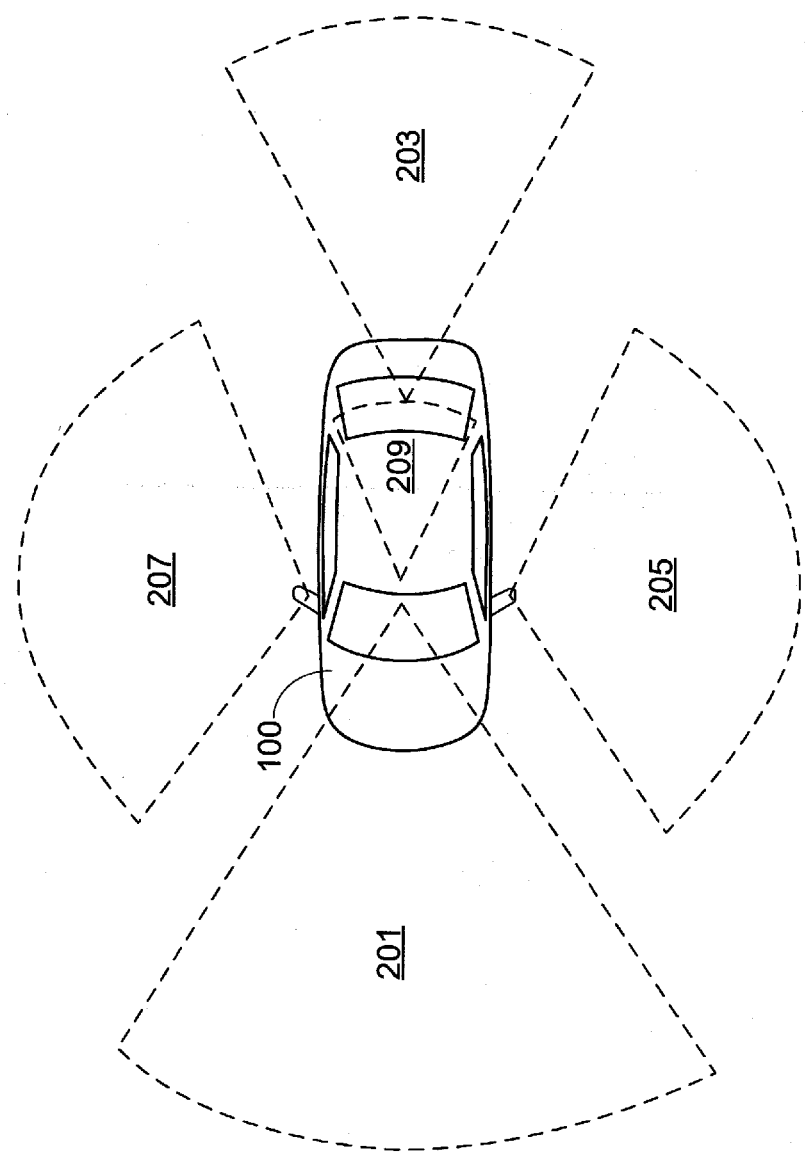
FIG. 2 provides the simplified view of the vehicle shown in FIG. 1, modified to include a plurality of cameras that may be used with the invention to display relevant images to the driver based on current conditions.

FIG. 2 provides the simplified view of vehicle 100 shown in FIG. 1 modified to include a plurality of cameras that may be used with the invention to display relevant images to the driver based on current conditions. As described in detail below, the current conditions used to trigger the display of the output from one of the cameras may include both data received from an object sensor, such as those described above relative to FIG. 1, or input from an activity sensor (e.g., turn signal, audio input, vehicle location, etc.). Additionally, and as noted above, these same cameras may also be used as sensing systems in order to define detection zones. In general the vehicle surroundings may be divided into four quadrants; front camera zone 201, rear camera zone 203, driver side camera zone 205 and passenger side camera zone 207. A single camera with a wide angle lens may be used for each of these zones; alternately, multiple cameras may be used in a particular zone(s). Camera zone 209 provides an internal view of the vehicle's passenger cabin. Typically zone 209 is used to monitor the rear portion of the passenger cabin, thus allowing the driver to easily monitor passengers, for example a baby, seated in a rear seat.

Figure 3:
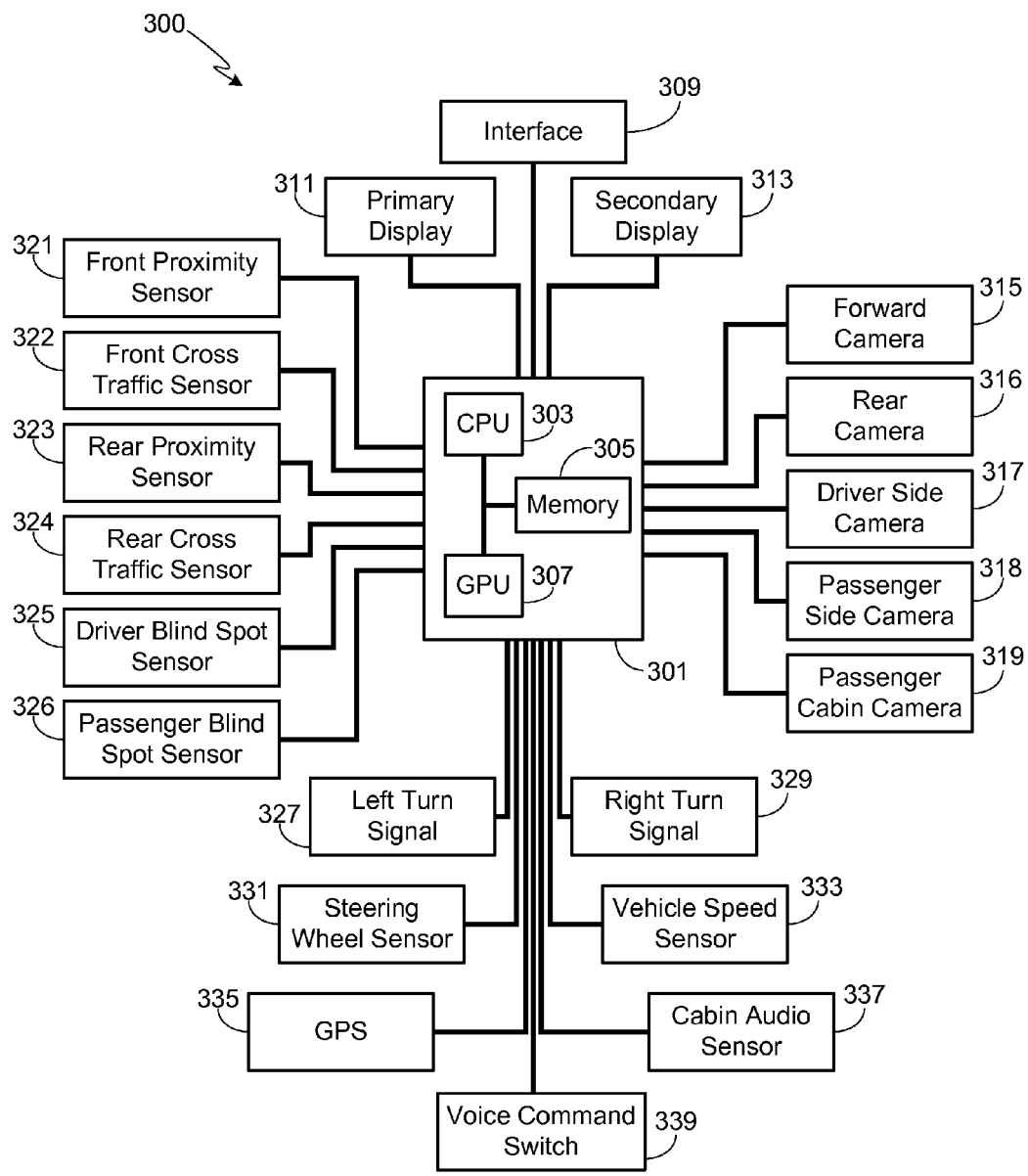
FIG. 3 provides a block diagram of the primary components utilized in the detection and display system of the invention.

FIG. 3 provides a block diagram of an exemplary control system 300 for use with a preferred embodiment of the invention. It should be understood that control system 300 is but one possible configuration and that other configurations may be used while still retaining the functionality of the invention. Additionally, one or more of the elements shown in FIG. 3 can be grouped together in a single device, and/or circuit board, and/or integrated circuit. For example, and as previously noted, the same camera may be used both to detect a possible obstacle as well as provide a view of that obstacle to the user.

Control system 300 includes a system controller 301 comprised of a central processing unit (CPU) 303 and a memory 305. Preferably system controller 301 also serves as the vehicle's management system. Memory 305 may be comprised of EPROM, EEPROM, flash memory, RAM, a solid state disk drive, a hard disk drive, or any other memory type or combination of memory types. Depending upon the type(s) of display used in vehicle 100 as well as the capabilities of CPU 303, controller 301 may also include a graphical processing unit (GPU) 307. CPU 303 and GPU 307 may be separate or contained on a single chip set.

Coupled to controller 301 is an interface 309. Interface 309 allows the driver, or a passenger, to interact with the vehicle management system, for example inputting data into the navigation system, altering the heating, ventilation and air conditioning (HVAC) system, controlling the vehicle's entertainment system (e.g., radio, CD/DVD player, etc.), adjusting vehicle settings (e.g., seat positions, light controls, etc.), and/or or otherwise altering the functionality of vehicle 100. In at least some embodiments, interface 309 also includes means for the vehicle management system to provide information to the driver and/or passenger, information such as a navigation map or driving instructions as well as the operating performance of any of a variety of vehicle systems (e.g., battery pack charge level for an electric car, fuel level for the engine in a hybrid or ICE-based vehicle, selected gear, current entertainment system settings such as volume level and selected track information, external light settings, current vehicle speed, current HVAC settings such as cabin temperature and/or fan settings, etc.).

Also coupled to controller 301 is at least one display system. In a preferred embodiment, the system includes a primary display 311 and a secondary display 313. The primary display is preferably larger than the secondary display, and is often situated in a more central location within the dashboard, thus allowing it to be more visible to the passenger. Display 311 if often used with the navigation system or as an element of the user interface. Secondary display 313 is preferably located within the instrument cluster or configured as a heads up display (HUD), thus making it easier to observe while driving. It should be understood that the invention may use a single display to present all camera views when activated; alternately, different views may be presented on different displays. For example, while the larger, centrally located display 311 may be ideal when the car is in reverse or is being parked, the secondary display 313 may provide easier viewing access when a side view camera is activated prior to changing lanes, or when a front view camera is activated in preparation for moving into traffic.

In the preferred embodiment, five cameras 315-319 are connected to controller 301. Camera 315 provides a view of zone 201 in front of the vehicle; camera 316 provides a view of zone 203 behind the vehicle; camera 317 provides a view of zone 205 to the driver's side of the vehicle; camera 318 provides a view of zone 207 to the passenger's side of the vehicle; and camera 319 provides a view of zone 209 within the vehicle's passenger cabin. It will be appreciated that fewer cameras may be used by the invention if a fewer number of views are desired. Additionally, and as noted above, multiple cameras may be used for a single zone, for example if greater resolution is desired.

Depending upon the desired capabilities for the system, and as described in more detail below, the system may base activation of a particular camera on the input of one or more sensors. Control system 300 illustrates the sensors used in at least one preferred embodiment of the invention. In this embodiment, sensors 321-326 correspond to various detection zones surrounding the vehicle. For example, front proximity sensor 321 may correspond to zone 103 or zone 105; front cross traffic sensor 322 may correspond to zone 105 or zone 109 or zone 111 or zone 113; rear proximity sensor 323 may correspond to zone 104; rear cross traffic sensor 324 may correspond to zone 106; driver side blind spot sensor 325 may correspond to zone 107; and passenger side blind spot sensor 326 may correspond to zone 108. In addition to zone detectors, control system 300 may also base camera activation on the input from a variety of sensors such as left turn signal 327, right turn signal 329, steering wheel position sensor 331, vehicle speed sensor 333, global positioning system (GPS) 335, and passenger cabin audio sensor 337.

Figure 4:
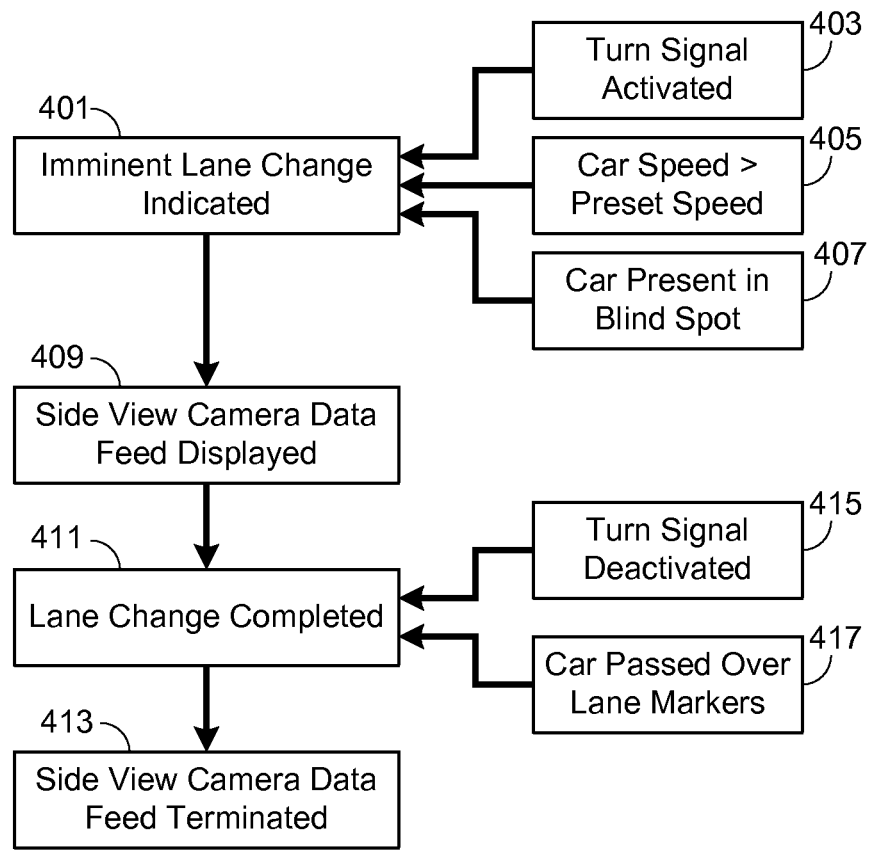
FIG. 4 illustrates the methodology associated with a preferred embodiment of the invention in which camera activation provides aid during lane changes.

FIG. 4 illustrates the methodology associated with a preferred embodiment of the invention in which camera activation provides aid during lane changes, specifically using side view cameras to eliminate blind spots when changing lanes. Initially the driver indicates that they intend to change lanes (step 401). While it is possible to continuously display the views provided by the side view cameras 317/318, i.e., views 205/207, this continuous display may be distracting to the driver during routine driving. Accordingly in this embodiment of the invention the side view cameras are only activated with needed.

There are a variety of techniques that may be used to sense that the driver wishes to change lanes (step 401). In order to minimize false positives, preferably at a minimum the driver must activate the turn signal, i.e., either left turn signal 327 or right turn signal 329 (step 403). In at least one configuration, in addition to receiving notice that a turn signal has been activated, prior to camera activation controller 301 must also receive confirmation that the car is traveling above a preset speed (step 405), where sensor 333 provides the vehicle speed data to the controller. The preset speed used in step 405 may be preset by the vehicle manufacturer, although preferably the user is able to set this speed, either directly or using a third party. By allowing the preset speed to be adjusted by the user, the user is able to eliminate this condition by setting the preset speed to 0 mph. Alternately, the user, or other party, is able to maintain a relatively high preset speed (e.g., 40 mph or higher) with the assumption that automatic side view camera activation is most useful when traveling at higher speeds, or based on the assumption that lane changes primarily occur on high speed, multi-lane highways.

In yet another configuration of this embodiment, after the driver activates a turn signal, and prior to activating a side view camera, controller 301 verifies that there is a car in the driver's blind spot (step 407) using blind spot sensor 325/326. In this configuration if there is not a car present in the driver's blind spot, the side view camera is not activated, thereby avoiding a possible driver distraction. It should be understood that in this embodiment the system may be configured to require either (i) turn signal activation and a car in the blind spot, or (ii) turn signal activation, a car in the blind spot, and the car traveling above the preset speed as described above.

Once the conditions required to indicate that an imminent lane change is desired have been met (step 401), then controller 301 automatically displays the side view camera information (step 409), thus making the driver's upcoming lane change safer by eliminating a blind spot in the driver's vision. Preferably only the side view corresponding to the desired lane change direction is presented, i.e., if the user activates the left turn signal 327 then the driver side camera 317 is activated in order to provide the driver with view 205, and conversely if the user activates the right turn signal 329 then the passenger side camera 318 is activated in order to provide the driver with view 207. In an alternate configuration, in step 409 both side view camera 317/318 are activated.

In the preferred embodiment, in step 409 controller 301 displays the data feed from the desired camera on the secondary display screen 313, thus allowing the driver to maintain a forward looking position. Alternately, the camera's data feed may be displayed on primary display screen 311. It will be appreciated, however, that if the primary display 311 is centrally located in the dashboard and the driver is attempting to change lanes to the driver's left side, making the driver look to the right towards the center of the dashboard is counter-intuitive. Assuming that there are multiple displays available as described above (e.g., displays 311 and 313), preferably the selection of the display is preset, for example by the manufacturer or by the user; alternately, the system may be configured to allow the user to select the display in real-time.

After completion of the lane change maneuver (step 411), controller 301 terminates the step of displaying the side view camera data (step 413). Controller 301 can be configured to utilize a variety of data in making the determination that the lane change has been completed. For example, deactivation of the turn signal (step 415) may be taken as evidence that the lane change has been completed. A benefit of basing display termination (step 413) on turn signal deactivation (step 415) is that if the user simply decides not to change lanes and turns off their turn signal, then the controller will terminate the side camera display even though in reality a lane change was not completed.

If the vehicle is equipped with a lane departure warning system as described above (e.g., sensor 322), than rather than using turn signal deactivation to indicate that the lane change has been completed or aborted, completion of the desired lane change (step 417) may be used to indicate to the controller that the display of the side view camera data should be terminated (step 413). In this configuration, once controller 301 determines that the vehicle has passed over the lane markers into the adjacent lane using the data from a lane monitoring system (e.g., sensor 322), then the controller terminates the step of displaying side view camera data.

It will be appreciated that in some situations the driver may decide not to change lanes. For example, the driver may see that due to traffic conditions the present lane is preferred. Alternately, once the side view camera feed is displayed, the driver may realize that there is a car in the blind spot and is thus unable to complete the desired lane change. The system can be configured to adapt to a situation where the lane change is not completed in a variety of ways. In one configuration, if the user deactivates the turn signal then the side view camera feed is terminated, deactivation occurring even if the lane change was not completed. In an alternate configuration, once activated the side view camera remains on for a preset period of time regardless of whether or not the lane change is completed. The preset period of time may be set by the vehicle's manufacturer, the driver, or a third party. In yet another configuration, the system's response depends on whether the turn signal activated in step 403 was a 'turn' signal (i.e., continuous blinking until deactivated) or a 'lane change' signal (i.e., blinks a limited number of time, typically three, or for a limited period of time). In this configuration the system may terminate the camera feed if the turn signal is used and then deactivated, and not terminate the camera feed until the car actually changes lanes if the lane change signal is used.

Figure 5:
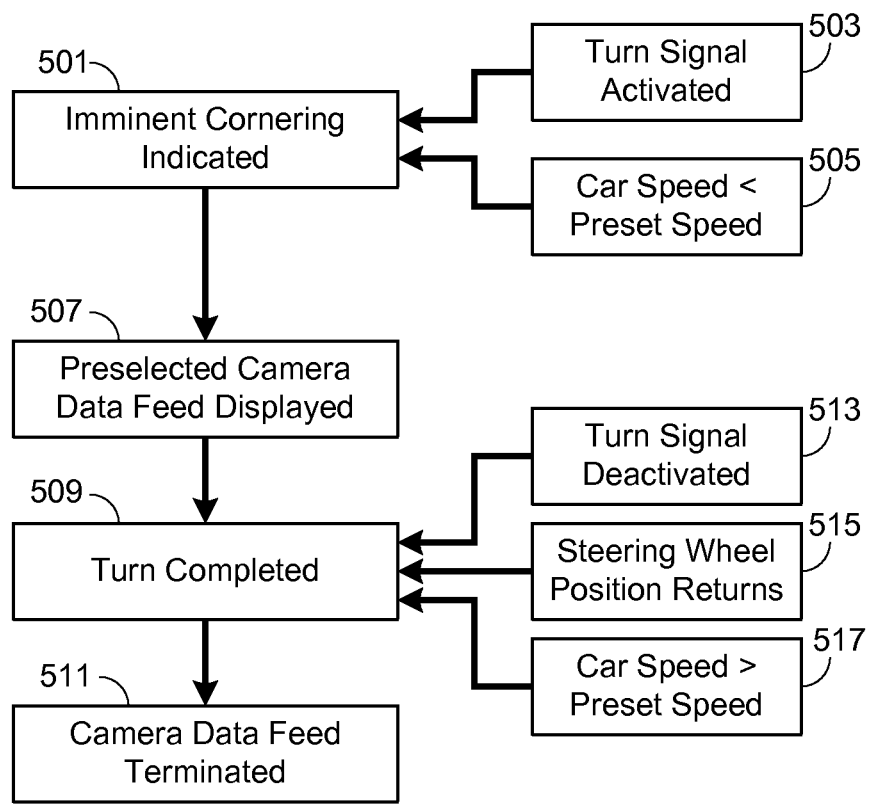
FIG. 5 illustrates the methodology associated with a preferred embodiment of the invention in which camera activation provides aid to the driver when making a turn.

FIG. 5 illustrates the methodology associated with a preferred embodiment of the invention in which camera activation provides aid to the driver when making a turn and, more specifically, helps minimize the dangers associated with entering into cross traffic by providing the driver with additional views of the on-coming traffic. Initially the driver indicates that they intend to turn a corner (step 501). While it is possible to continuously display the views provided by the side view cameras 317/318 (i.e., views 205/207) and/or the front view camera 315 (i.e., view 201), providing a continuous camera display may be distracting to the driver during routine driving. Accordingly in this embodiment of the invention the cameras are only activated with needed.

Preferably in this embodiment routine cornering, i.e., steering to the left or right, is distinguished from turning into a corner where cross traffic may be present and where the additional views provided by on-board cameras may aid the driver in negotiating that traffic. There are a variety of techniques that may be used to sense that the driver wishes to turn a corner, potentially into traffic (step 501). In order to minimize false positives, preferably at a minimum the driver must activate the turn signal, i.e., either left turn signal 327 or right turn signal 329 (step 503). In at least one configuration, in addition to receiving notice that a turn signal has been activated, prior to camera activation controller 301 must also receive confirmation that the car is traveling below a preset speed (step 505), where sensor 333 provides the vehicle speed data to the controller. The preset speed used in step 505 may be preset by the vehicle manufacturer, although preferably the user is able to set this speed, either directly or using a third party. By allowing the preset speed to be adjusted by the user, the user is able to eliminate this condition by setting the preset speed to a very high speed (e.g., 100 mph). The use of a relatively low speed (e.g., 10 mph or lower) in step 505 provides a means for distinguishing between the car changing lanes on a multi-lane highway and merging into traffic where the additional views provided by the on-board cameras may be useful. In at least one configuration, the preset speed used in step 505 is set to 0 mph so that the additional camera views provided by this embodiment are only activated when the car stops, for example at a stop sign or a stop light, in preparation for making a turn into traffic. Rather than use 0 mph, the value set for the preset speed may be slightly above 0 mph (e.g., 2 mph), thus taking into account the 'rolling stop' performed by many drivers.

Figure 6:
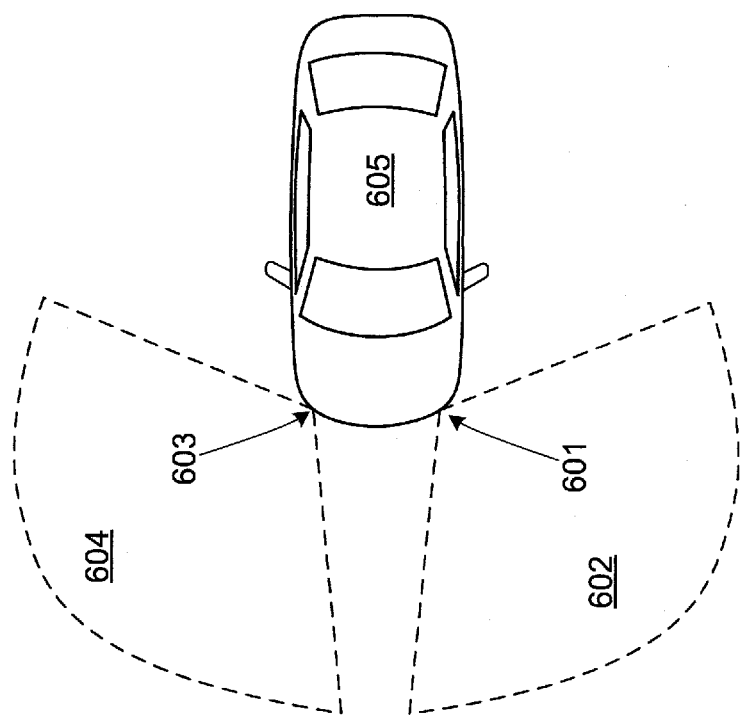
FIG. 6 illustrates preferred camera locations for an embodiment that provides cross traffic information to the driver.
Figure 7:
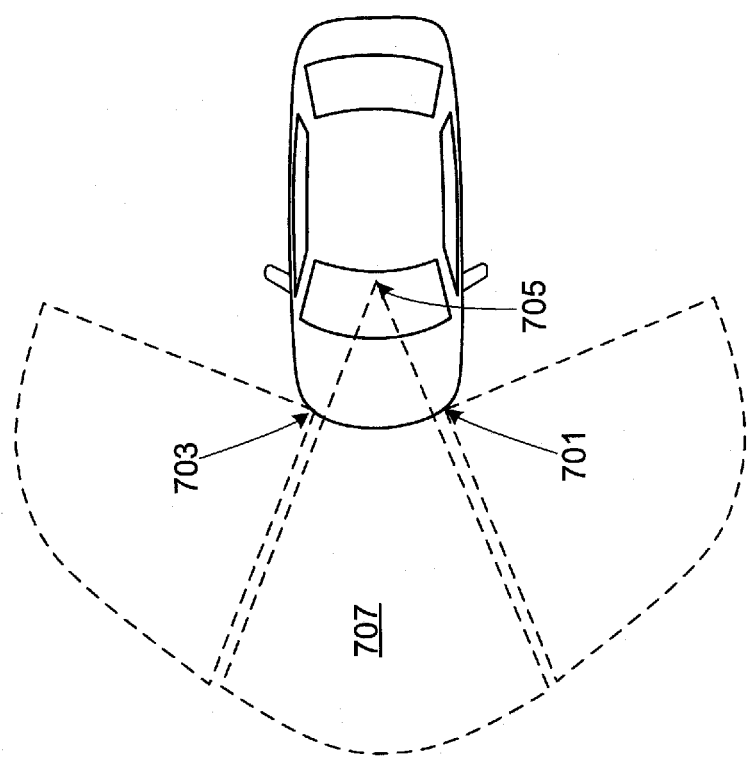
FIG. 7 illustrates alternate camera locations for an embodiment that provides cross traffic information to the driver.

Once the conditions are met that indicate that the driver is attempting to turn a corner or otherwise merge into traffic (step 501), then controller 301 automatically displays the camera information from the preselected cameras (step 507). During step 507, preferably the camera data from both side cameras 317 and 318 is displayed; more preferably the camera data from side cameras 317/318 as well as the data from front camera 315 is displayed. It should be understood that the camera locations shown in FIG. 2 are only illustrative, and that other camera locations may be used. For example, FIG. 6 illustrates an embodiment in which two cameras are used, with camera 601 providing front and driver side views of zone 602, and camera 603 providing front and passenger side view of zone 604. It will be appreciated that by moving the camera locations forward from those shown in FIG. 2, and in particular forward of the driver's position within vehicle 605, an improved cross traffic view is provided to the driver. Preferably cameras 601/603 are located within the front lighting assemblies, thus hiding them from casual observation. FIG. 7 illustrates yet another configuration in which cameras 701 and 703 provide left and right views, respectively, while camera 705 provides a view of forward zone 707. Preferably the views provided by these cameras have minimal or no overlap, thus minimizing driver confusion. It should be understood that the cameras shown in FIGS. 6 and 7 are those preferably used to provide cross traffic information to the driver, and that either of these configurations may utilize other cameras as well (e.g., blind spot cameras, rear facing camera, in-cabin camera, etc.).

Preferably controller 301 displays the data feed from the preselected camera(s) on the secondary display screen 313, thus allowing the driver to maintain a forward looking position while still benefiting from the additional information provided by the cameras. Alternately, the cameras' data feed may be displayed on primary display screen 311. Assuming that there are multiple displays available as described above (e.g., displays 311 and 313), preferably the selection of the display is preset, for example by the manufacturer or by the user; alternately, the system may be configured to allow the user to select the display in real-time.

After completion of the turn (step 509), controller 301 terminates the step of displaying the selected camera data (step 511). In at least one embodiment, deactivation of the turn signal (step 513) is used to indicate that the turn has been completed. Alternately, controller 301 may monitor the position of the steering wheel using sensor 331, basing the decision to terminate displaying the camera data feed on the steering wheel first rotating sufficiently to indicate that a turn is being made and then rotating back to the nominal center position indicating that the car is traveling forward in approximately a straight-ahead direction (step 515). Alternately, controller 301 may monitor vehicle speed using sensor 333, basing the decision to terminate displaying the camera data feed on the car returning to a higher speed, i.e., greater than a preset speed (step 517).

Figure 8:
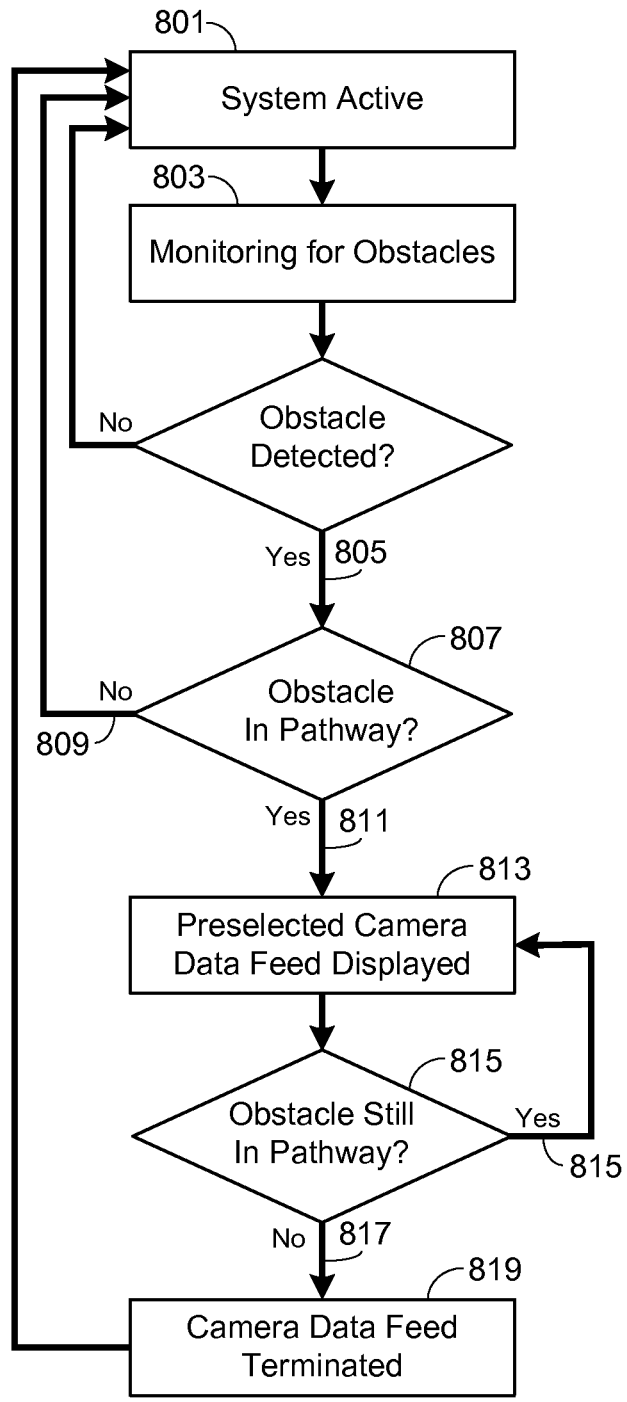
FIG. 8 illustrates the methodology associated with an embodiment of the invention in which a camera's data feed is displayed when an obstacle is detected in the vehicle's intended pathway.

FIG. 8 illustrates the methodology associated with a preferred embodiment of the invention in which a camera's data feed is displayed when the controller 301 determines that there is an obstacle in the vehicle's intended pathway. Preferably in this embodiment the system is active whenever the car is in motion. Alternately, the system can be configured to be active whenever the car is turned on, i.e., engine running in an ICE-based vehicle or power on in an electric/hybrid vehicle. Alternately, the system can be configured to allow the user to either turn on or turn off the feature at will, thus allowing individual users determine when to utilize the system.

Once the system is active (step 801), controller 301 continually monitors for potential obstacles in the direction of travel (step 803). Therefore if the car is traveling in a forward direction, controller 301 is monitoring the forward pathway using front sensors 321 and 322; alternately, if the car is traveling backwards then controller 301 monitors the rearward pathway using rear sensors 323 and 324. Regardless of whether the car is traveling forwards or backwards, if the car is moving in a non-straight path, controller 301 also monitors side-view sensors (e.g., sensors 325 and 326) for obstacles that may be in the vehicle's pathway while turning.

Whenever an obstacle is detected (step 805), controller 301 then determines whether or not the obstacle is in the vehicle's pathway (step 807). If the obstacle is not in the vehicle's pathway (step 809), then the system simply continues to monitor for potential obstacles (step 803). If controller 301 determines that the obstacle may be in the vehicle's pathway (step 811) then the camera feed that shows that obstacle is automatically displayed (step 813). Accordingly if the car is moving forward in a relatively straight direction, then zone 201 from forward camera 315 is automatically displayed when the obstacle is detected; similarly, if the car is moving backward in a relatively straight direction, then zone 203 from rear camera 316 is automatically displayed when the obstacle is detected; similarly, if the car is turning while moving forward than the appropriate camera feeds are automatically displayed (e.g., zones 201 and 205 if the car is moving forward while turning left; zones 201 and 207 if the car is moving forward while turning right; zones 203 and 205 if the car is moving backward while turning left; and zones 203 and 207 if the car is moving backward while turning right).

In step 813 in which the camera feed that shows the obstacle is displayed, preferably controller 301 displays the data feed on the secondary display screen 313, thus allowing the driver to maintain a forward looking position while still benefiting from the additional information provided by the cameras. Alternately, the cameras' data feed may be displayed on primary display screen 311. Assuming that there are multiple displays available as described above (e.g., displays 311 and 313), preferably the selection of the display is preset, for example by the manufacturer or by the user; alternately, the system may be configured to allow the user to select the display in real-time.

Once a potentially blocking obstacle is detected (step 811) and the appropriate camera feed is displayed (step 813), controller 301 continues to monitor the obstacle to determine if it is still in the vehicle's pathway (step 815). As long as the obstacle remains in the vehicle's path (step 815), the controller continues to display the data feed from the appropriate camera (step 813). Once the obstacle is no longer in the vehicle's pathway (step 817), for example because the obstacle has moved or because the vehicle changes direction, then the camera data feed is terminated (step 819) and the system goes back to monitoring for obstacles.

Figure 9:
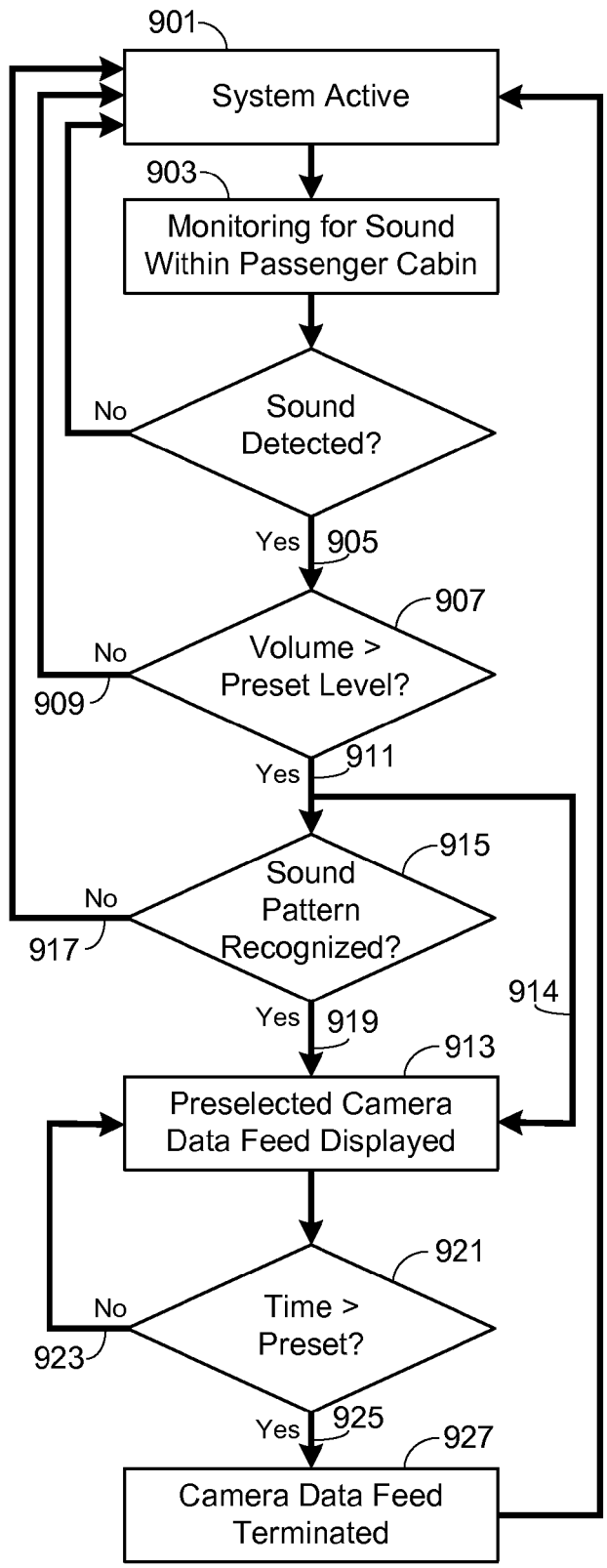
FIG. 9 illustrates the methodology associated with an embodiment of the invention in which the passenger cabin camera's data feed is automatically displayed based on sounds within the passenger cabin.

FIG. 9 illustrates the methodology associated with a preferred embodiment of the invention in which the data feed from camera 319 in the passenger cabin is automatically displayed based on sounds within the passenger cabin. This embodiment is especially useful for parents with small children as it allows them to monitor their child in certain situations without stopping the car or turning around in the driver's seat, thereby avoiding the creation of a potentially unsafe condition. Preferably in this embodiment the system is active whenever the car is in motion. Alternately, the system can be configured to be active whenever the car is turned on, i.e., engine running in an ICE-based vehicle or power on in an electric/hybrid vehicle. Alternately, the system can be configured to allow the user to either turn on or turn off the feature at will, thus allowing individual users determine when to utilize the system.

Once the system is active (step 901), controller 301 continually monitors the passenger cabin using audio sensor 337 (step 903). In at least one configuration, audio sensor 337 is directional and is positioned to favor sound pick-up from the rear portion of the passenger cabin. Whenever a sound is heard within the passenger cabin (step 905), controller 301 determines whether or not the sound level is above a preset volume (step 907). Step 907 allows the system to distinguish between routine background noise such as traffic noise intruding into the passenger cabin or normal passenger conversations and sounds that are intended to trigger the camera display. If the detected sound level is below the preset level (step 909), then the system simply continues to monitor the sound level within the passenger cabin (step 903). The preset volume level used in step 907 may be preset by the vehicle manufacturer, although preferably the user is able to set this volume level, either directly or using a third party. By allowing the preset volume level to be adjusted by the user, the user is able to determine the operational sensitivity of the system.

In one configuration, if controller 301 determines that the detected sound level is greater than the preset level (step 911), then the camera feed from the passenger cabin camera 319 is automatically displayed (step 913, following optional process step 914). In the preferred embodiment, however, once the volume level exceeds the preset level (step 911) the controller uses sound recognition software (step 915) to analyze the detected audio and determine whether or not it is of a nature that should trigger the in-cabin camera, e.g., a baby crying. The sound recognition software may utilize sound patterns preset by the vehicle's manufacturer or a third party. In at least one configuration, the user is able to select the sound patterns used by the sound recognition software. In at least one other configuration, the user is able to preset the sound patterns, for example by recording sound patterns that they wish the software to recognize (e.g., the sounds of their own baby crying).

If the sound pattern is not recognized (step 917), then the system simply continues to monitor the sound level within the passenger cabin (step 903). If the sound pattern is recognized as a triggering pattern (step 919), then the camera feed from the passenger cabin camera 319 is automatically displayed (step 913). Preferably the camera feed from passenger cabin camera 319 is displayed on the primary display 311, thus making it easily viewed by either the driver or the passenger, assuming that display 311 is centrally mounted in the dashboard. Alternately, the cameras' data feed may be displayed on secondary display screen 313. Assuming that there are multiple displays available as described above (e.g., displays 311 and 313), preferably the selection of the display is preset, for example by the manufacturer or by the user; alternately, the system may be configured to allow the user to select the display in real-time.

Once the in-cabin camera feed is being displayed (step 913), preferably controller 301 monitors the length of time that the display has been active and compares that time to a preset time interval (step 921). As long as the monitored length of time is less than the preset time interval (step 923), the in-cabin camera feed continues to be displayed (step 913). Once the length of time exceeds the preset time interval (step 925), then the camera data feed is terminated (step 927) and the system goes back to monitoring the sound level within the passenger cabin (step 903). Preferably the preset time interval used in step 921 may be preset by the vehicle manufacturer, the user or a third party. Step 921 insures that once triggered, the in-cabin camera feed is not displayed indefinitely.

Figure 10:
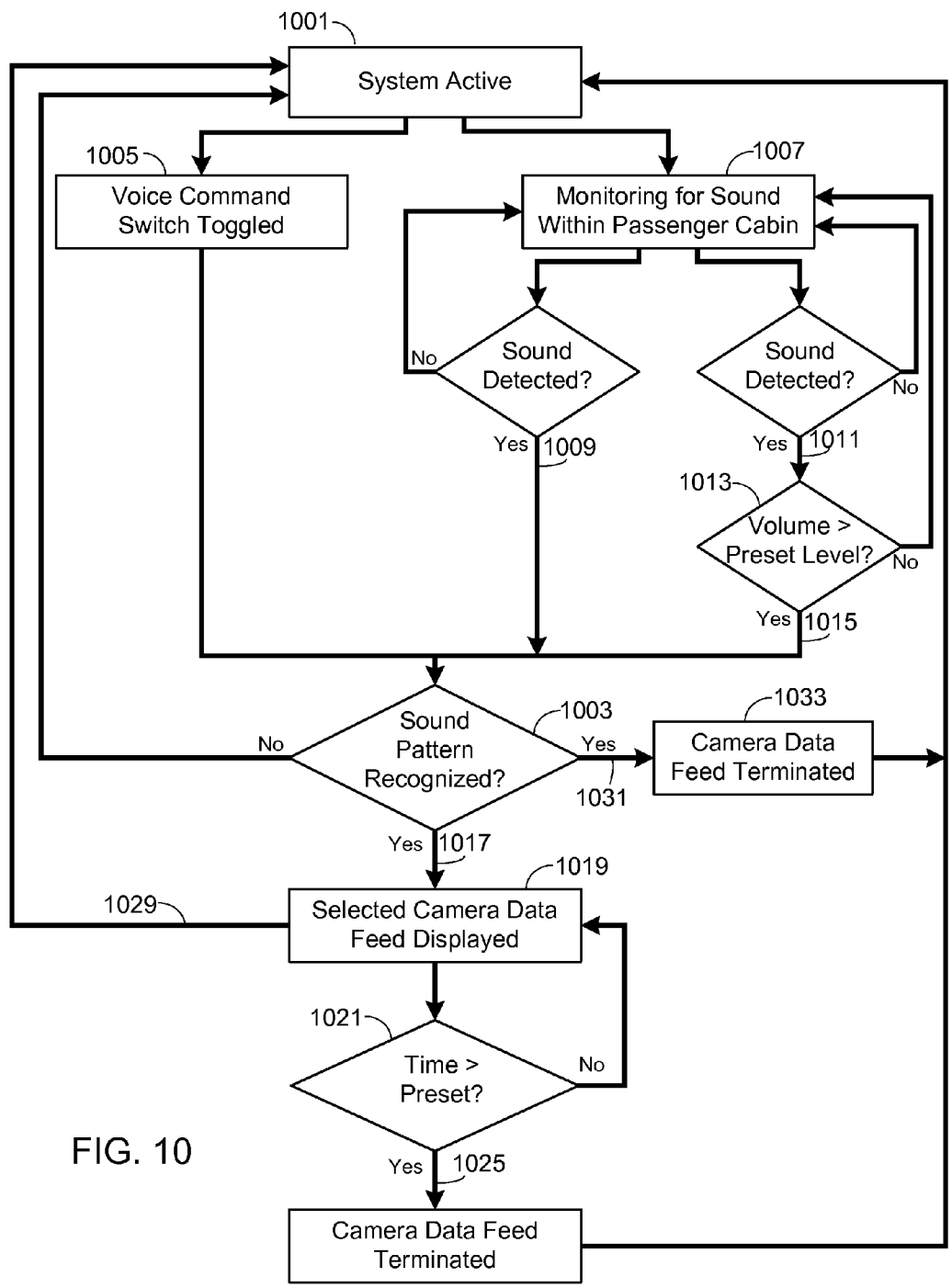
FIG. 10 illustrates the methodology associated with an embodiment of the invention in which the data feed from a camera is displayed based on a voice command.

FIG. 10 illustrates the methodology associated with a preferred embodiment of the invention in which the data feed from a camera is displayed based on a voice command. Preferably in this embodiment the system is active (step 1001) whenever the car is in motion. Alternately, the system can be configured to be active whenever the car is turned on, i.e., engine running in an ICE-based vehicle or power on in an electric/hybrid vehicle. Alternately, the system can be configured to allow the user to either turn on or turn off the feature at will, thus allowing individual users determine when to utilize the system.

The voice command embodiment may be configured to utilize any of several different techniques for determining when to employ the speech recognition system used in step 1003. For example, in one configuration the system requires the user to toggle a switch 339 that, once toggled, indicates to controller 301 that the user is going to issue a voice command (step 1005). Switch 339 may be mounted on the steering wheel, dashboard or other location. Once toggled, controller 301 uses the speech recognition system to determine the nature of the command (step 1003). Alternately, rather than waiting for the user to toggle switch 339, controller 301 may be configured to continually monitor the passenger cabin for issued voice commands using audio sensor 337 (step 1007). Then, whenever audio is detected (step 1009), controller 301 may use the speech recognition system to determine what command, if any, has been issued (step 1003). Alternately, whenever audio is detected (step 1011) the system can be configured to compare the volume level of the detected sound to a preset level (step 1013). In this configuration the system only proceeds to the speech recognition step (i.e., step 1003) if the volume of the detected sound exceeds a preset level (step 1015), thereby helping to minimize false positives by distinguishing between routine background noise and voice commands.

During step 1003, the speech recognition system is used to determine the exact nature of the user's command. Preferably the user is able to display the data feed from any available camera simply by issuing the correct command. For example, the system may be configured to accept the command "show driver side camera" for camera 317, "show passenger side camera" for camera 318, "show forward camera" for camera 315, "show rear camera" for camera 316, and "show in-cabin camera" for cabin 319. It will be appreciated that these are exemplary commands and that other command language may be used to activate and display a particular camera. Once a command has been recognized by the system (step 1017), including identification of a particular camera, then the selected camera feed is displayed, either on display 311 or 313 (step 1019). Preferably the selection of the display, i.e., either display 311 or display 313, is preset in the system. Alternately, the system may be configured to allow the user to instruct the system as to which display to use, e.g., "show the passenger side camera on the center display".

After the desired camera feed is being displayed (step 1019), preferably controller 301 monitors the length of time that the display has been active and compares that time to a preset time interval (step 1021). As long as the monitored length of time is less than the preset time interval (step 1023), the desired camera feed continues to be displayed (step 1013). Once the length of time exceeds the preset time interval (step 1025), then the camera data feed is terminated (step 1027) and the system is re-initialized (step 1001). Preferably the preset time interval used in step 1021 may be preset by the vehicle manufacturer, the user or a third party. Step 1021 insures that once triggered, the camera feed is not displayed indefinitely.

In an alternate configuration, after the desired camera feed is being displayed (step 1019), the system reverts to monitoring for voice commands (step 1029). As previously noted, the system may continuously monitor for voice commands (step 1007) or may require that the user toggle switch 339 (step 1005), thereby indicating to controller 301 that the user is going to issue a voice command. In this configuration the system does not terminate the display of the indicated camera feed based on elapsed time, rather the system waits until the user issues a deactivation command that is recognized in step 1003 (step 1031). Once a recognized deactivation command is received, the system terminates the camera data feed (step 1033). It will be appreciated that the system may be configured to accept any of a variety of deactivation commands, such as "stop showing the driver side camera" or "terminate camera display", etc.

Figure 11:
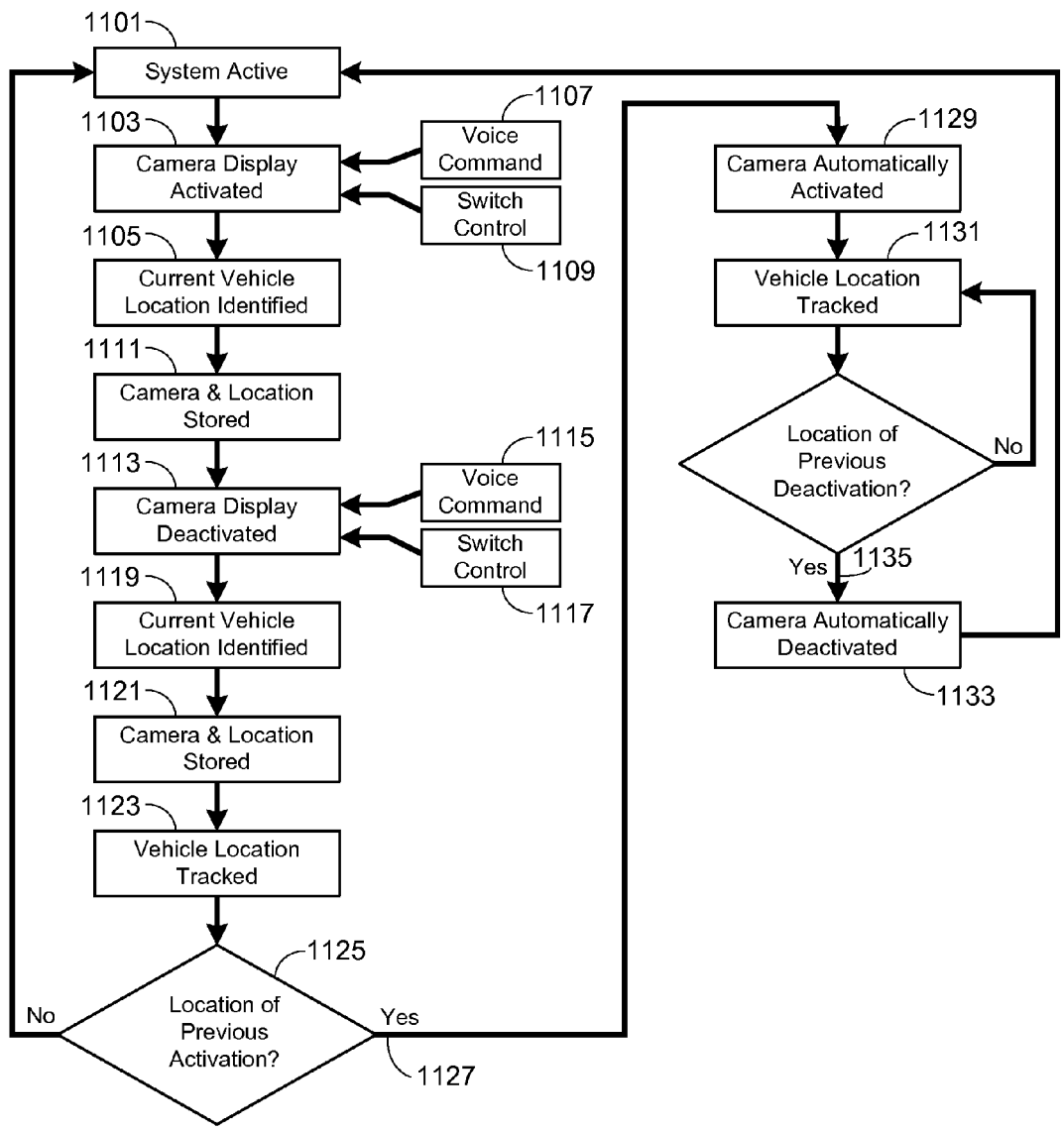
FIG. 11 illustrates the methodology associated with an embodiment of the invention in which the data feed from a camera is automatically displayed on an in-cabin display based on a previous activation of the same camera at the same location.

FIG. 11 illustrates the methodology associated with a preferred embodiment of the invention in which the data feed from a camera is automatically displayed on an in-cabin display based on a previous activation of the same camera at the same geographic location. For example, the vehicle may be routinely parked in a garage where the garage door is barely larger than the width of the car. Under these circumstances the driver may find it useful to activate side cameras 317 and 318. This embodiment allows the system to automatically activate the side cameras based on a previous activation of those same cameras at that same location.

In this embodiment the system is active whenever the car is in motion/turned on or whenever the feature is turned on (step 1101). Then, when the user activates a particular camera (step 1103) in order to display the data feed from the selected camera, controller 301 identifies the current location (step 1105) using GPS 335. The user may select and activate the camera using a voice command (step 1107) or a camera activation switch (step 1109). Controller 301 then records in memory 305 both the identity of the activated camera, assuming that the car has more than one camera, and the location where the camera was activated (step 1111). Similarly, when the user deactivates the camera (step 1113), for example using a voice command (step 1115) or a camera deactivation switch (step 1117), controller 301 identifies the current location (step 1119) and records in memory 305 both the identity of the deactivated camera and the location where the deactivation occurred (step 1121).

After controller 301 has recorded in memory one or more locations where the user has activated a specific camera display, the system continuously monitors the vehicle's location (step 1123) and compares the current location to those locations recorded in memory 305 (step 1125). Whenever a current location matches up to a location stored in memory 305 in which the user had previously activated a camera (step 1127), then controller 301 automatically activates the same camera (step 1129). The system continues to monitor the vehicle's location (step 1131) and then deactivates the camera (step 1133) whenever the current location matches up to the location stored in memory 305 in which the user had previously deactivated the camera (step 1135).

Figure 12:
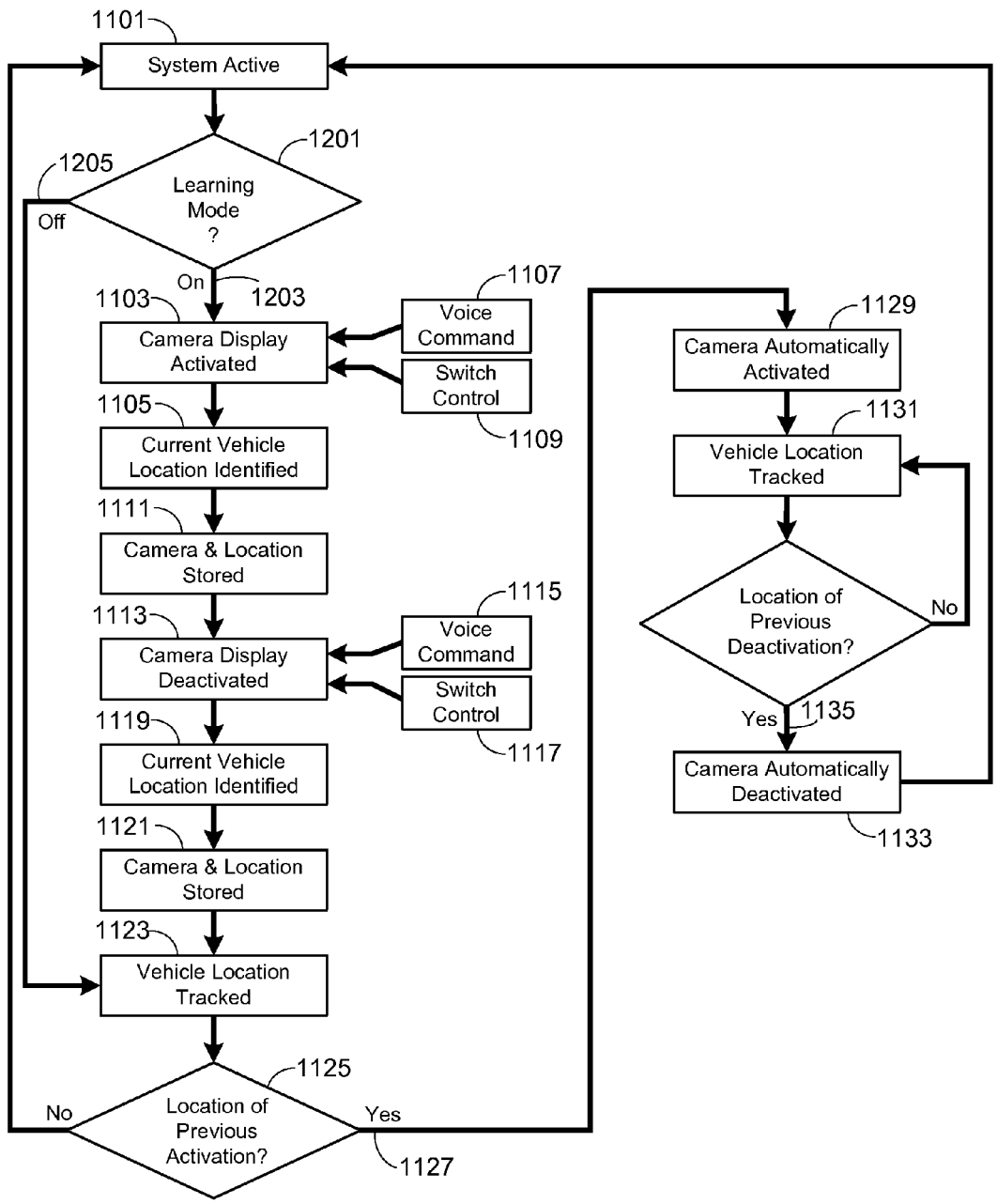
FIG. 12 illustrates a modification of the methodology shown in FIG. 11.

It will be appreciated that there may be times when the user wants to activate a camera without the system recording the activation/deactivation of the camera. Accordingly in a preferred embodiment, the user is able to activate a 'learning' mode. As shown in FIG. 12, in this configuration the system can be placed in the learning mode in step 1201. If the user activates the learning mode (step 1203), then the procedure follows that described above relative to FIG. 11. If the user does not activate the learning mode (step 1205), then the system by-passes steps 1103-1121. In this mode the system simply monitors vehicle location (step 1123) and activates/deactivates cameras based on previously learned behavior.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A method of automatically activating an in-cabin camera system mounted within a passenger cabin of a vehicle, the method comprising the step of:
   detecting a plurality of sounds generated from within the passenger cabin of the vehicle with an in-cabin audio sensor;
   monitoring an output of said in-cabin audio sensor with a vehicle system controller;
   comparing a volume level corresponding to said plurality of sounds to a preset volume level, wherein said vehicle system controller automatically performs said comparing step;
   automatically displaying a data feed from the in-cabin camera system on an in-cabin display when said volume level of said plurality of sounds exceeds said preset volume level; and
   terminating said step of automatically displaying said data feed, wherein said terminating step is performed after a preset period of time has elapsed since said volume level of said plurality of sounds exceeded said preset volume level.

2. The method of claim 1, further comprising the steps of:
   analyzing said plurality of sounds; and
   determining if at least one of said plurality of sounds matches at least one preset sound pattern, wherein said vehicle system controller automatically performs said analyzing and said determining steps, and wherein said step of automatically displaying said data feed is only performed if said volume level of said plurality of sounds exceeds said preset volume level and said at least one of said plurality of sounds matches said at least one preset sound pattern.

3. The method of claim 2, wherein said terminating step is performed after said preset period of time has elapsed since said volume level of said plurality of sounds exceeded said preset volume level and said at least one of said plurality of sounds matched said at least one preset sound pattern.

4. The method of claim 2, further comprising the step of storing said at least one preset sound pattern in a memory accessible by said vehicle system controller.

5. The method of claim 4, wherein said step of storing said at least one preset sound pattern in said memory is performed by a vehicle manufacturer.

6. The method of claim 4, wherein said step of storing said at least one preset sound pattern in said memory is performed by a vehicle user.

7. The method of claim 1, further comprising the step of setting said preset volume level, wherein said step of setting said preset volume level is performed by a vehicle manufacturer.

8. The method of claim 1, further comprising the step of setting said preset volume level, wherein said step of setting said preset volume level is performed by a vehicle user.

9. The method of claim 1, further comprising the step of setting said preset period of time, wherein said step of setting said preset period of time is performed by a vehicle manufacturer.

10. The method of claim 1, further comprising the step of setting said preset period of time, wherein said step of setting said preset period of time is performed by a vehicle user.

11. The method of claim 1, further comprising the step of positioning said in-cabin audio sensor to accentuate detection of said plurality of sounds from a rear portion of the passenger cabin of the vehicle.

12. The method of claim 11, further comprising the step of selecting a directional sensor for said in-cabin audio sensor.

13. The method of claim 1, wherein the in-cabin camera system observes a rear portion of the passenger cabin of the vehicle.

14. The method of claim 1, wherein said step of automatically displaying said data feed further comprises the step of displaying said data feed on either a primary display or a secondary display, wherein said method further comprises the step of selecting between said primary display and said secondary display.

15. The method of claim 14, wherein said step of selecting between said primary display and said secondary display is preset and performed by a vehicle manufacturer.

16. The method of claim 14, wherein said step of selecting between said primary display and said secondary display is performed real-time by a vehicle user.

17. The method of claim 14, wherein said step of selecting between said primary display and said secondary display is preset and performed by a vehicle user.

* * * * *